(12) United States Patent
Grosser, Jr. et al.

(10) Patent No.: US 6,202,094 B1
(45) Date of Patent: *Mar. 13, 2001

(54) ADDING LINKS SIMULTANEOUSLY TO A MULTILINK BUNDLE USING BANDWIDTH ALLOCATION PROTOCOL

(75) Inventors: Donald Bruce Grosser, Jr., Raleigh; Cloyd Stanley McIlvaine, Durham, both of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,171

(22) Filed: Nov. 7, 1997

(51) Int. Cl.[7] ............................. G06F 15/16; G06F 15/76
(52) U.S. Cl. ..................... 709/226; 709/226; 709/230; 709/237; 340/825.03; 370/465; 370/480
(58) Field of Search ..................... 709/226, 227, 709/229, 230, 236, 237; 340/825.03; 370/464, 465, 480

(56) References Cited

U.S. PATENT DOCUMENTS

| | | | |
|---|---|---|---|
| 4,163,124 | 7/1979 | Jolissaint | 179/18 D |
| 4,345,116 | 8/1982 | Ash et al. | 179/18 EA |
| 4,349,702 | 9/1982 | Joel, Jr. | 179/18 GE |
| 4,862,496 | 8/1989 | Kelly et al. | 379/221 |
| 4,991,204 | 2/1991 | Yamamoto et al. | 379/221 |
| 5,231,633 * | 7/1993 | Kluchyj et al. | 370/94.1 |
| 5,231,649 * | 7/1993 | Duncanson . | |
| 5,440,558 * | 8/1995 | Ban | 370/85.1 |
| 5,446,735 * | 8/1995 | Tobagi et al. | 370/85.3 |
| 5,509,122 * | 4/1996 | Bartow et al. | 395/200.15 |
| 5,521,971 | 5/1996 | Key et al. | 379/220 |
| 5,574,938 * | 11/1996 | Bartow et al. | 395/800 |
| 5,577,035 * | 11/1996 | Hayter et al. | 370/60 |
| 5,669,347 * | 9/1997 | Cullen et al. | 123/306 |
| 5,721,908 * | 2/1998 | Largarde et al. | 395/610 |
| 5,781,528 * | 7/1998 | Sato et al. | 370/218 |
| 5,784,559 * | 7/1998 | Frazier et al. | 395/200.13 |
| 5,841,840 * | 11/1998 | Smith et al. | 379/93.01 |
| 5,850,518 * | 12/1998 | Northrup | 395/200.33 |
| 5,878,040 * | 3/1999 | Peirce, Jr. et al. | 370/389 |
| 6,009,106 * | 12/1999 | Rustad et al. . | |
| 6,044,107 * | 3/2000 | Gatherer et al. . | |
| 6,070,192 * | 5/2000 | Holt et al. | 709/227 |
| 6,073,176 * | 6/2000 | Baindur et al. | 709/227 |
| 6,075,788 * | 6/2000 | Vogel . | |

OTHER PUBLICATIONS

William Simpson, RFC1570. Network Working Group, 1–17, Jan. 1994.*

Keith Sklower, RFC 1990, Network Working Group, 1–21, Aug. 1996.*

Craig Richards, RFC 2125, Network Working Group, 1–21, Mar. 1997.*

* cited by examiner

Primary Examiner—Mark Rinehart
Assistant Examiner—Stephan Willett
(74) Attorney, Agent, or Firm—Kelly K. Kordzik; Joscelyn G. Cockburn

(57) ABSTRACT

In a point-to-point multilink bundle coupling two peers over a network, a simultaneous addition of a plurality of links may be performed using Bandwidth Allocation Protocol and Bandwidth Allocation Control Protocol. When one peer desires to add more links to the multilink bundle, a request is sent to the other peer requesting the addition of the links and means for establishing the links, such as telephone numbers. In response, the second peer will respond with a message indicating the number of links the second peer is capable of adding along with the associated means for establishing these links.

26 Claims, 6 Drawing Sheets

FIG. 7

| Type | Identifier | Length |
|------|------------|--------|
| Data · · · | | |

FIG. 8

| Type | Identifier | Length |
|------|------------|--------|
| Response Code | Data · · · | |

FIG. 9

| Type | Length | N |
|------|--------|---|

ADDING LINKS SIMULTANEOUSLY TO A MULTILINK BUNDLE USING BANDWIDTH ALLOCATION PROTOCOL

TECHNICAL FIELD

The present invention relates in general to network communications, and in particular, to the use of multiple links to connect two endpoints on a network.

BACKGROUND INFORMATION

Several protocols have been implemented to facilitate communications over a network, such as a Wide Area Network (WAN), ISDN network, or even the Internet. One of these protocols is the point-to-point protocol (PPP), which provides a standard method for transporting multi-protocol datagrams over point-to-point links. The PPP protocol is set forth in Request for Comments 1661, which is published at http://ds.internic.net/rfc/rfc1661.txt, and is hereby incorporated by reference herein.

Another established protocol is the PPP Multilink protocol (MP), which provides a method for splitting, recombining and sequencing datagrams across multiple logical data links between two endpoints, or peers. The MP protocol was originally motivated by the desire to exploit multiple bearer channels in ISDN, but is equally applicable to any situation in which multiple PPP links connect two systems, including async links. Multilink protocol negotiation permits a system to indicate to its peer that it is capable of combining multiple physical links into a "bundle." A system indicates to its peer that it is willing to do multilink by sending the multilink option as part of the initial negotiation between the two systems. The goal of multilink operation is to coordinate multiple independent links between a fixed pair of systems, providing a virtual link with greater bandwidth than any of the constituent members. The bundled links can be different physical links, as in multiple async lines, but may also be instances of multiplexed links, such as ISDN, X.25 or Frame Relay. The links may also be of different kinds, such as pairing dial-up async links with leased synchronous links.

The PPP Multilink protocol is set forth in Request for Comments 1990 and published at http://ds.internic.net/rfc/rfc1990.txt, which is hereby incorporated by reference herein.

Another related protocol is the PPP Bandwidth Allocation Protocol (BAP) and the associated PPP Bandwidth Allocation Control Protocol (BACP), which provide a method to manage the dynamic bandwidth allocation of implementations supporting the PPP multilink protocol. The BAP and BACP are set forth in Request for Comments 2125 and published at http//ds.internic.net/rfc/rfc2125.txt, which is hereby incorporated by reference herein. The BAP can be used to manage the number of links in a multilink bundle and defines datagrams to coordinate adding and removing individual links in a multilink bundle, as well as specifying which peer is responsible for which decisions regarding managing bandwidth during a multilink connection.

The problem with these existing protocols is that if a system desires to add N links (e.g., ISDN B-channels) to an MP bundle, it will have to wait for N sequential BAP requests where each request consists of a BAP request message, BAP response message, call completion, and BAP status message (N represents a positive integer). Therefore, there is a need in the art for a system and method for adding N links to an MP bundle in a simultaneous fashion, which will allow for increased responsiveness to transient network loads.

SUMMARY OF THE INVENTION

The present invention addresses the foregoing need by providing a modification to existing BAP negotiations by adding two new BAP packet types: BAP N-Calls-Request and BAP N-Calls-Response. With these two packet types, when a first peer decides to add a number of links to an MP bundle the peer sends a BAP N-Calls-Request along with the number of links desired to the second peer. If the second peer agrees to additional links, it will return a BAP N-Calls-Response, with a number representing the number of links it is capable of adding, along with associated phone numbers. The first peer will then place the calls adding the links and will thereafter send a BAP Status-Indication message to the second peer indicating how many of the links were successfully completed.

In an alternative embodiment of the present invention, the process of the present invention for adding multiple links simultaneously will only be implemented if both peers are capable of supporting such a process.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates the format for a BAP N-Calls-Request packet;

FIG. 8 illustrates the format for the BAP N-Calls-Response packet; and

FIG. 9 illustrates a BAP Options packet included with the BAP N-Calls-Request packet.

DETAILED DESCRIPTION

Figure 1:
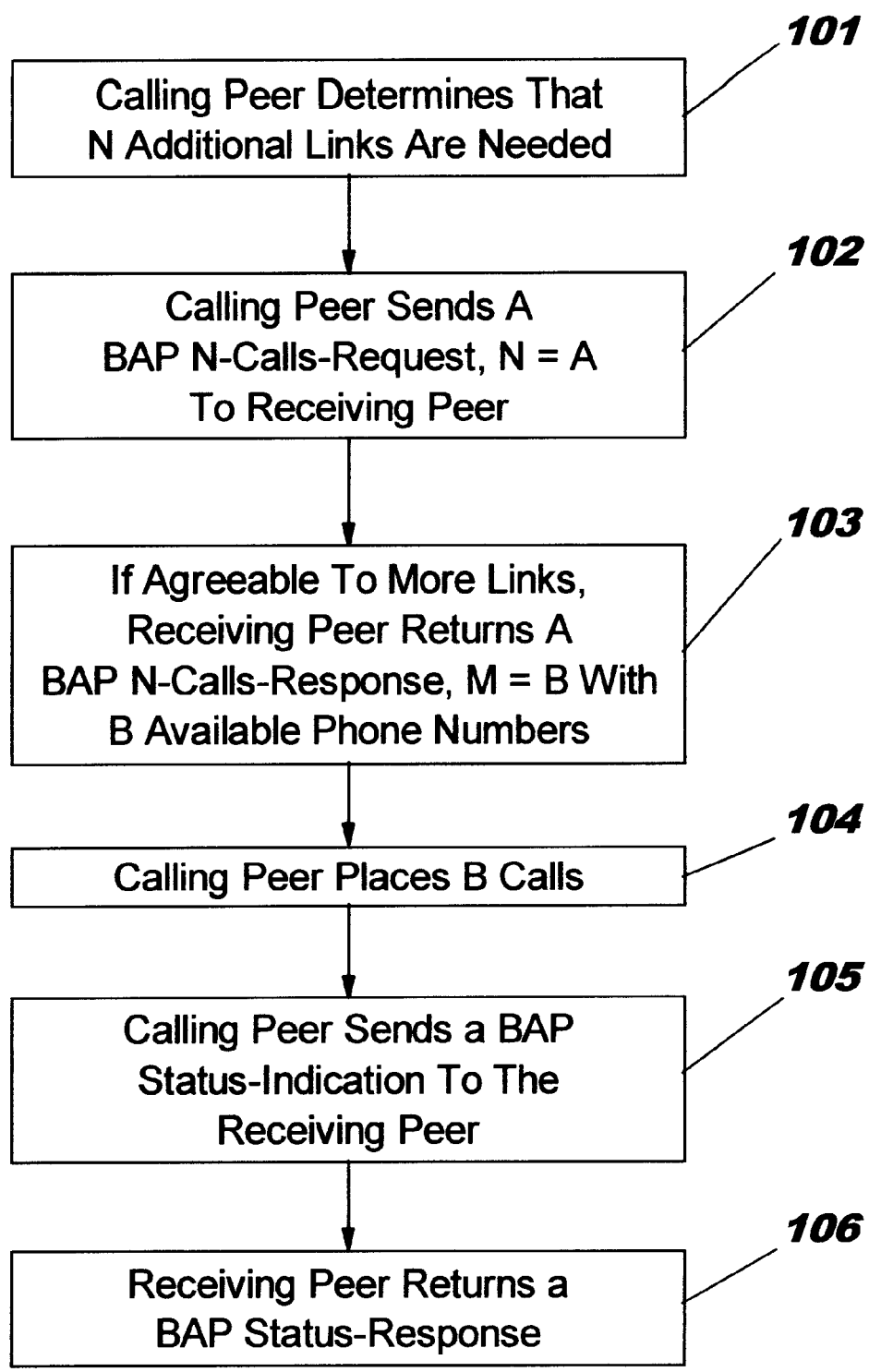
FIG. 1 illustrates a process in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
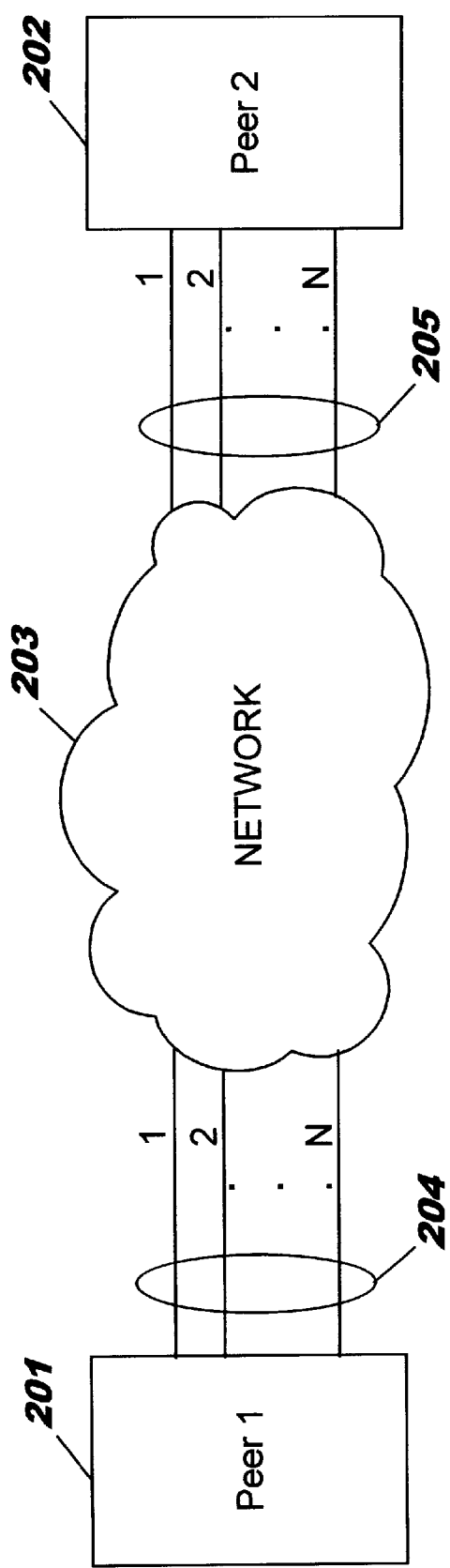
FIG. 2 illustrates a multilink bundle coupling two peers.

Referring to FIG. 2, there is illustrated a simplified diagram of a typical point-to-point communication occurring over a network. Hereinafter, network may refer to a WAN, ISDN network, the Internet or any equivalent telecommunications network, which may or may not be implemented over a public switched telephone network ("PSTN"). Data processing systems 201 and 202 (hereinafter referred to as peer 1 and peer 2, respectively), have established communications with each other over network 203. Peer 1 is connected to network 203 by links 204, while peer 2 is connected to network 203 by links 205.

For purposes of the present invention, peer 1 and peer 2 are communicating by a PPP Multilink bundle, which has been established by the aforementioned PPP Multilink protocol. The bundle may comprise one or more of the N links in links 204 and 205. Within the following discussion, links 204 and 205 may be separate telephone lines, ISDN channels, leased lines, and any other equivalent telecommunications link capable of transmitting datagrams.

During the communication of information between peer 1 and peer 2, peer 1 may execute an operation or process that determines that more bandwidth is needed between peer 1 and peer 2. The reasons why additional bandwidth is needed are not necessary for an understanding of the present invention. Furthermore, a discussion of the operation or process for determining that additional bandwidth is needed is also not required for an understanding of the present invention.

Under the present BAP and BACP as set forth in RFC 2125 referenced above, if peer 1 determines that additional bandwidth is needed, then the following BAP negotiations will be entered into to add one link to the existing bundle between peer 1 and peer 2:

(1) Peer 1 determines that an additional link is required.
(2) Peer 1 sends a BAP Call-Request, requesting an available phone number to dial to add an associated link to the bundle.
(3) Peer 2, if it agrees to the addition of the link, sends a BAP Call-Response (an acknowledgment) along with an available phone number to call.
(4) Peer 1 places the call using the provided phone number.
(5) Peer 1 sends a BAP Status-Indication message notifying peer 2 whether it was successful or failed.
(6) Peer 2 sends a BAP Status-Response (an acknowledgment to the BAP Status-Indication).

The BAP Call-Request, BAP Call-Response, BAP Status-Indication, and BAP Status-Response packets are all fully discussed within RFC 2125.

Referring to FIG. 1, the process of the present invention begins with a calling peer (peer 1) determining that N (N>1) additional links are required for additional bandwidth. As an example, N may be equal to 10. In step 102, peer 1 sends a BAP N-Calls-Request message with N=A (in this example, A=10) to the receiving peer (peer 2), requesting A available phone numbers (or an equivalent channel depending on the particular channel types implemented). BAP N-Calls-Request is similar to the existing BAP Call-Request, with the addition of the requested number of links N.

Referring to FIG. 7, there is illustrated the format for a BAP N-Calls-Request packet. The Type field is one octet and identifies the type of BAP datagram packet. Datagram types are defined as follows wherein this field is coded in binary coded hexadecimal.

| 01 | Call-Request |
| 02 | Call-Response |
| 03 | Callback-Request |
| 04 | Callback-Response |
| 05 | Link-Drop-Query-Request |
| 06 | Link-Drop-Query-Response |
| 07 | Call-Status-Indication |
| 08 | Call-Status-Response |

The present invention adds two new packet types:

| 09 | N-Calls-Request |
| 10 | N-Calls-Response |

Therefore, in step 102, the BAP N-Calls-Request message has 09 in the Type field.

The Identifier field is one octet and is binary coded. It aids in matching Requests and Indications with Responses. Call-Status-Indication packets must use the same Identifier as was used by the original Call-Request for a Callback-Request that was used to initiate the call. All other Request or Indication packets must use a unique Identifier for each new Request or Indication. All Response packets must use the same Identifier as the Identifier in the Request or Indication packet being responded to. When transmitting a Request or Indication, the Identifier must be the same as the Identifier used on the previous transmission of the Request or Indication.

The Length field is two octets and indicates the length of the packet including the Type, Identifier, Length and Options fields. It is binary coded. Octets outside the range of the Length field should be treated as Data Link Layer padding and should be ignored on reception. The Data field is variable in length, and will usually contain the list of zero or more BAP Options that the sender desires to transmit.

The BAP N-Calls-Request will include a BAP Options packet as illustrated in FIG. 9. The Type field is one octet, and indicates the type of the BAP Datagram Option. This field is binary coded hexadecimal. The following options are defined:

| | |
|---|---|
| 01 | Link-Type |
| 02 | Phone-Delta |
| 03 | No-Phone-Number-Needed |
| 04 | Reason |
| 05 | Link-Discriminator |
| 06 | Call-Status |

The present invention adds another option which is:

| | |
|---|---|
| 07 | N |

This Option 07 is mandatory for packet type 09 and packet type 10 when the Response code indicates ACK. N, specified in packet type 10, corresponds to the number of Phone-Delta options included and represents the number of requested additional links. Note that the value in N for packet type 10 is less than or equal to the value in N for packet type 09.

In step 103, if peer 2 is agreeable to increasing the number of links between peer 1 and peer 2 within the multilink bundle, peer 2 will return a BAP N-Calls-Response packet, along with a designation of the number of links M that peer 2 is capable, or agreeable, of adding (M≧1). For example, peer 2 may designate M=B wherein B is equal to 8. In such a case, peer 2 did not have 10 available links as requested by peer 1. The BAP N-Calls-Response packet will also include the phone numbers, or other channel designations, for permitting peer 1 to begin making the link connections.

FIG. 8 illustrates the format for the BAP N-Calls-Response packet, which includes fields similar to those illustrated in FIG. 7 of the Request packet, but also includes a Response Code field, which is binary coded and may have the following values:

| | |
|---|---|
| 00000000 | Request-Ack |
| 00000001 | Request-Nak |
| 00000010 | Request-Rej |
| 00000011 | Request-Full-Nak |

The Request-Ack Response code will be sent by peer 2 to indicate that the Request command is valid and was successfully received by an implementation. The Type field within the BAP N-Calls-Response packet will have a 10 Type and will include a BAP option having a 07 Type with N equal to M, which in this example is B.

In step 104, peer 1 begins placing the B calls agreed to by peer 2. In step 105, peer 1 sends a BAP Status-Indication packet to peer 2 with an indication of the number of successful connections from the B calls made by peer 1. The BAP Status-Indication packet is similar to the BAP Status-Indication packet presently existing and discussed within RFC 2125. The Type field within the BAP Status-Indication packet will be 07. The Data field within this packet will include a BAP option packet with N indicating the number of successful connections.

In step 106, peer 2 returns a BAP Status-Response acknowledging the BAP Status-Indication packet. The Type field within the BAP Status-Response packet will be 08.

The result of the process illustrated in FIG. 1 is that the bundle will now include B additional links for increasing the bandwidth between peer 1 and peer 2.

Figure 4:
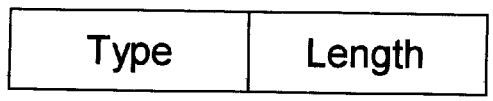
FIG. 4 illustrates a BACP option in support of the present invention.

In order for peer 1 to communicate successfully with systems, or peers, not supporting the present invention (i.e., BAP N-Calls-Request/Response packets), a BACP option, Support-BAP-N-Calls, may be implemented wherein implementations not recognizing this option will reject a request for a simultaneous addition of N links. FIG. 4 illustrates such a BACP option configuration. The Type and Length fields within this BACP option configuration may be programmed to provide a notification that the option of supporting the simultaneous addition of N links is requested.

Figure 5:
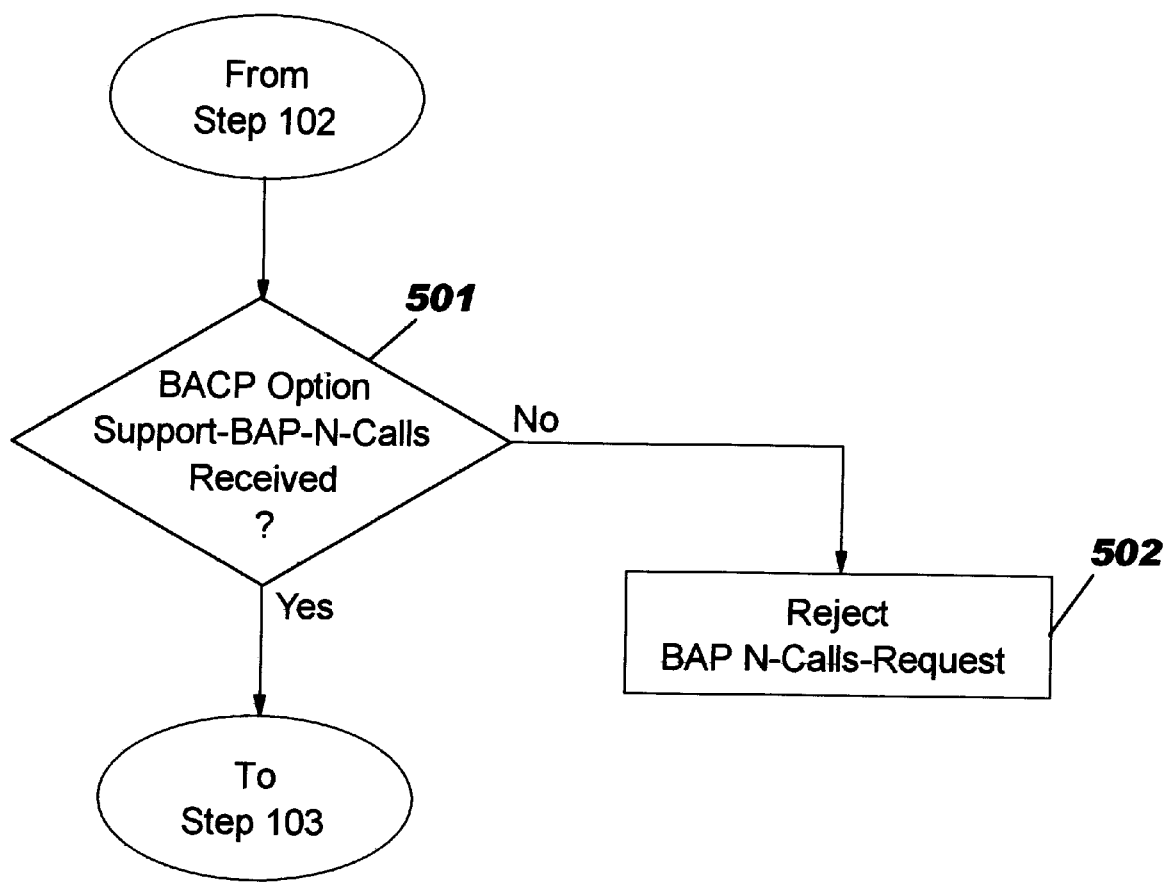
FIG. 5 illustrates an alternative embodiment of the present invention.

One alternative embodiment for supporting such a BACP option is illustrated in FIG. 5. From step 102 in FIG. 1, the present invention may be configured to proceed to step 501, wherein a determination is made whether or not the BACP option Support-BAP-N-Calls has been previously received by peer 2. If not, then peer 2 will reject the BAP N-Calls-Request in step 502. However, if peer 2 has received the BACP option in step 501, then the process will continue to step 103.

Figure 6:
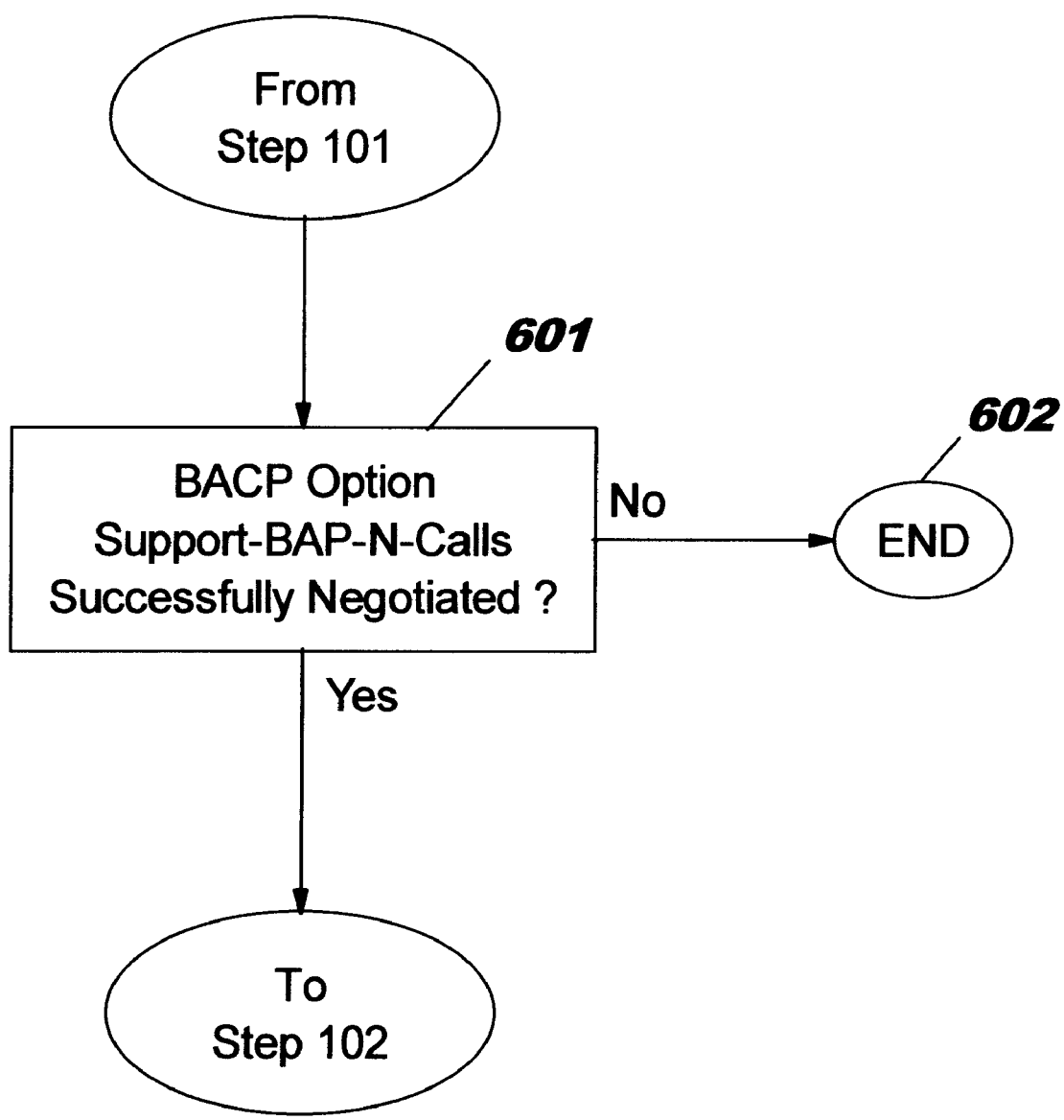
FIG. 6 illustrates another alternative embodiment of the present invention.

Another alternative embodiment of the present invention is illustrated in FIG. 6 wherein from step 101 in FIG. 1, step 601 is performed, wherein a determination is made whether or not the BACP option has been previously successfully negotiated between peer 1 and peer 2. If not, the process ends in step 602. However, if this BACP option has previously been successfully negotiated, then the process is allowed to proceed to step 102.

The present invention may be embodied within hardware, such as logic circuits, or as software within peer 1 and peer 2.

Figure 3:
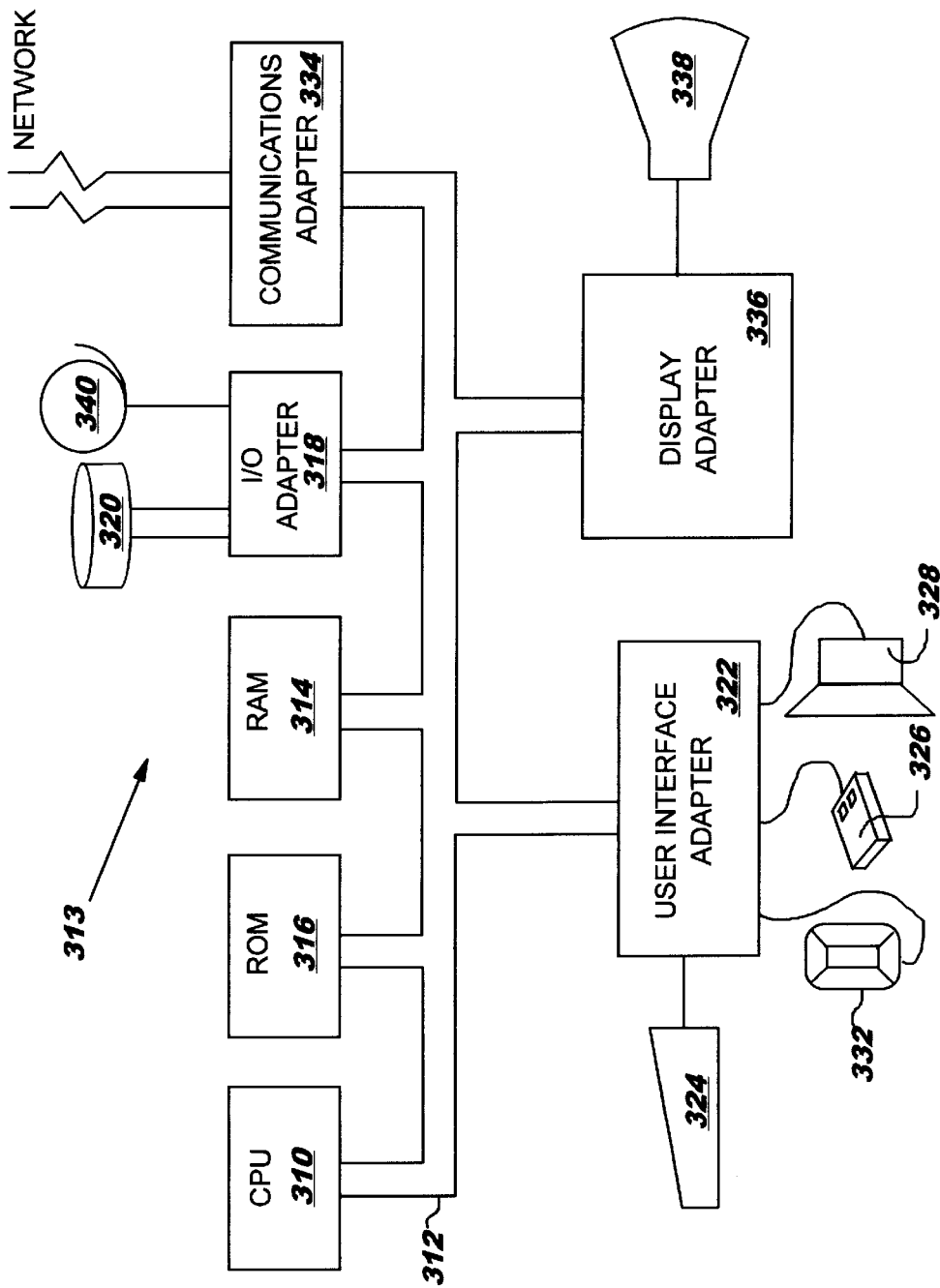
FIG. 3 illustrates a data processing system configured in accordance with the present invention.

A representative hardware environment for practicing the present invention is depicted in FIG. 3, which illustrates a typical hardware configuration of workstation 313 in accordance with the subject invention having central processing unit (CPU) 310, such as a conventional microprocessor, and a number of other units interconnected via system bus 312. Workstation 313 includes random access memory (RAM) 314, read only memory (ROM) 316, and input/output (I/O) adapter 318 for connecting peripheral devices such as disk units 320 and tape drives 340 to bus 312, user interface adapter 322 for connecting keyboard 324, mouse 326, speaker 328, microphone 332, and/or other user interface devices such as a touch screen device (not shown) to bus 312, communication adapter 334 for connecting workstation 313 to a data processing network, and display adapter 336 for connecting bus 312 to display device 338. CPU 310 may include other circuitry not shown herein, which will include circuitry commonly found within a microprocessor, e.g., execution unit, bus interface unit, arithmetic logic unit, etc. CPU 310 may also reside on a single integrated circuit.

Peers 1 and 2 may utilize some or all of the components of system 313. Furthermore, the present invention may be in the form of software running on one or both of peers 1 and 2.

Although the present invention and its advantages have been described in detail, it should be understood that various changes, substitutions and alterations can be made herein without departing from the spirit and scope of the invention as defined by the appended claims.

What is claimed is:

1. A method for adding additional links to a PPP multilink bundle between first and second peers, said method comprising the steps of:

establishing a PPP multilink bundle between the first peer and the second peer using PPP Multilink protocol;

determining by the first peer that additional bandwidth is needed in the PPP multilink bundle;

sending, from the first peer to the second peer, a BAP N-Calls-Request packet that includes a request for additional links to be established in the bundle, wherein the BAP N-Calls-Request packet includes a packet type that specifies that N additional links are requested, wherein N is greater than one;

returning, from the second peer to the first peer, a BAP N-Calls-Response packet that includes a response to the BAP N-Calls-Request packet that includes a packet type designating a number M of additional links that the second peer is capable of adding to the PPP multilink bundle, wherein N may or may not be equal to M; and establishing the M additional links in the bundle.

2. The method as recited in claim 1, wherein the PPP multilink bundle is established over the Internet between the first and second peers.

3. The method as recited in claim 2, wherein M is greater than one.

4. The method as recited in claim 3, further comprising the steps of:

sending, from the first peer to the second peer, a message indicating how many of the M additional links were successfully established.

5. The method as recited in claim 1, wherein the BAP N-Calls-Response packet includes channel designations for permitting the first peer to begin establishing the M additional links.

6. The method as recited in claim 1, further comprising the step of:

establishing, between the first and second peers, a capability by both of the peers to simultaneously add links to the bundle, wherein the step of establishing the capability is performed by a Bandwidth Allocation Control Protocol option packet, and wherein the step of establishing the capability is performed before the step of sending, from the first peer to the second peer, the request for N additional links.

7. The method as recited in claim 6, wherein the step of sending, from the first peer to the second peer, the request for N additional links is not performed if the step of establishing the capability has not been performed.

8. The method as recited in claim 3, wherein the links are established simultaneously.

9. A data processing system operable for communicating as a first peer over the Internet via a PPP multilink bundle with a second peer, said system comprising:

circuitry operable for establishing a PPP multilink bundle between the first peer and the second peer using PPP Multilink protocol;

circuitry operable for determining by the first peer that additional bandwidth is needed in the PPP multilink bundle;

circuitry operable for sending, from the first peer to the second peer, a BAP N-Calls-Request packet that includes a request for additional links to be established in the bundle, wherein the BAP N-Calls-Request packet includes a packet type that specifies that N additional links are requested, wherein N is greater than one;

circuitry operable for receiving, from the second peer by the first peer, a BAP N-Calls-Response packet that includes a response to the BAP N-Calls-Request packet that includes a packet type designating a number M of additional links that the second peer is capable of adding to the PPP multilink bundle, wherein N may or may not be equal to M; and circuitry operable for establishing the M additional links in the bundle.

10. The system as recited in claim 9, wherein M is greater than one.

11. The system as recited in claim 9, further comprising:

circuitry operable for sending, from the first peer to the second peer, a message indicating how many of the M additional links were successfully established.

12. The method as recited in claim 1, wherein the BAP N-Calls-Response packet includes channel designations for permitting the first peer to begin establishing the M additional links.

13. The system as recited in claim 9, further comprising:

circuitry operable for establishing, between the first and second peers, a capability by both of the peers to simultaneously add links to the bundle, wherein the establishing circuitry uses a Bandwidth Allocation Control Protocol option packet.

14. The system as recited in claim 9, wherein the links are established substantially.

15. A program product adaptable for storage on a program storage media, the program product operable for adding additional links to a PPP multilink bundle between first and second peers, said program product comprising:

programming for establishing a PPP multilink bundle between the first peer and the second peer using PPP Multilink protocol;

programming for determining by the first peer that additional bandwidth is needed in the PPP Multilink bundle;

programming for sending, from the first peer to the second peer, a BAP N-Calls-Request packet that includes a request for additional links to be established in the bundle, wherein the BAP N-Calls Request packet includes a packet type that specifies that N additional links are requested, wherein N is greater than one;

programming for returning, from the second peer to the first peer, a BAP N-Calls Response packet that includes a response to the BAP N-Calls-Request packet that includes a packet type designating a number M of additional links that the second peer is capable of adding to the PPP multilink bundle, wherein N may or may not be equal to M, wherein M is greater than one; and programming for establishing the M additional links in the bundle.

16. The program product as recited in claim 15, wherein the PPP multilink bundle is established over a network between the first and second peers, wherein the links are established substantially.

17. The program product as recited in claim 16, further comprising:

programming for sending, from the first peer to the second peer, a message indicating how many of the M additional links were successfully established.

18. The method as recited in claim 1, wherein the BAP N-Calls-Response packet includes channel designations for permitting the first peer to being establishing the M additional links.

19. The program product as recited in claim 16, further comprising:

programming for establishing, between the first and second peers, a capability by both of the peers to simultaneously add links to the bundle, wherein the programming for establishing the capability is performed using a Bandwidth Allocation Control Protocol option packet, and wherein the programming for establishing the capability is performed before the programming for sending, from the first peer to the second peer, the request for N additional links.

20. The program product as recited in claim 19, wherein the programming for sending, from the first peer to the second peer, the request for N additional links is not performed if the programming for establishing the capability has not been performed.

21. The program product as recited in claim 16, wherein the network is the Internet.

22. The program product as recited in claim 16, wherein the network is a wide area network.

23. The program product as recited in claim 16, wherein the network is an ISDN connection.

24. The method as recited in claim 1, wherein the following step is performed previous to the sending step:

establishing an operational PPP multilink bundle between the first and second peers.

25. The system as recited in claim 9, further comprising:

circuitry operable for establishing an operational PPP multilink bundle between the first peer and the second peer previous to the first peer sending the request to the second peer.

26. The program product as recited in claim 15, further comprising:

programming for establishing an operational PPP multilink bundle between the first peer and the second peer, wherein the establishment of the operational PPP multilink bundle is performed before sending of the request for N additional links.

* * * * *